(12) United States Patent
Thongrattana et al.

(10) Patent No.: US 8,947,651 B1
(45) Date of Patent: Feb. 3, 2015

(54) TESTER FOR MEASURING A PITCH STATIC ATTITUDE OF A HEAD STACK ASSEMBLY

(71) Applicant: Western Digital Technologies, Inc., Irvine, CA (US)

(72) Inventors: Chaiya Thongrattana, Donmuang (TH); Angkhan Thongsuksai, Thunyaburi (TH); Prasertsak Naksakul, Muang (TH); Teeraporn Srikwanjai, Nakornchaisri (TH); Chainat Krudpuek, Bangpahun (TH)

(73) Assignee: Western Digital Technologies, Inc., Irvine, CA (US)

( * ) Notice: Subject to any disclaimer, the term of this patent is extended or adjusted under 35 U.S.C. 154(b) by 246 days.

(21) Appl. No.: 13/685,665

(22) Filed: Nov. 26, 2012

(51) Int. Cl.
*G01B 11/26* (2006.01)
*G11B 5/455* (2006.01)

(52) U.S. Cl.
CPC ...................................... *G11B 5/455* (2013.01)
USPC .......... 356/139.03; 356/6; 356/507; 356/151; 356/141.2; 356/138

(58) Field of Classification Search
USPC ......... 356/139.03, 151, 507, 141.2, 138, 614, 356/6, 5.01–5.15, 3.01–3.16, 4.01–4.1
See application file for complete search history.

(56) References Cited

U.S. PATENT DOCUMENTS

| 4,907,848 | A | * | 3/1990 | Pavlath ........................... 359/19 |
| 5,661,555 | A | * | 8/1997 | Romer et al. ............ 356/139.03 |
| 5,956,212 | A | * | 9/1999 | Zhu ............................ 360/245.4 |
| 6,711,929 | B2 | * | 3/2004 | Yamaguchi et al. ......... 72/342.1 |
| 7,069,156 | B2 | * | 6/2006 | Zeng ................................ 702/43 |
| 7,152,303 | B2 | * | 12/2006 | Childers et al. ............ 29/603.06 |
| 7,461,933 | B2 | * | 12/2008 | Deily et al. .................... 347/102 |
| 7,550,695 | B2 | | 6/2009 | Ichimura et al. |
| 7,661,189 | B2 | * | 2/2010 | Shindo et al. .................... 29/737 |
| 7,764,387 | B2 | * | 7/2010 | Girard et al. ................... 356/614 |
| 7,817,259 | B2 | * | 10/2010 | Smith et al. .................... 356/138 |
| 8,169,743 | B2 | * | 5/2012 | Knigge et al. .............. 360/234.6 |
| 2002/0116978 | A1 | * | 8/2002 | Yamaguchi et al. ......... 72/342.1 |
| 2002/0171970 | A1 | * | 11/2002 | Girard et al. ................... 360/77.03 |
| 2006/0109453 | A1 | * | 5/2006 | Swift et al. ................ 356/139.03 |
| 2007/0075061 | A1 | * | 4/2007 | Shindo et al. ............ 219/121.83 |
| 2008/0212107 | A1 | * | 9/2008 | Girard et al. ................... 356/614 |

FOREIGN PATENT DOCUMENTS

JP          2000339894 A     12/2000

* cited by examiner

*Primary Examiner* — Luke Ratcliffe
*Assistant Examiner* — Assres H Woldemaryam

(57) ABSTRACT

A tester for measuring a pitch static attitude of a head stack assembly including a laser transmitter configured to transmit laser beams, and a laser receiver configured to receive the laser beams from the laser transmitter, wherein the laser transmitter and the laser receiver are configured to receive a head stack assembly between the laser transmitter and the laser receiver. The tester also includes a laser guide located between the laser transmitter and the laser receiver, and configured to block the laser beams from entering a gap in the head stack assembly and reaching the laser receiver.

15 Claims, 10 Drawing Sheets

TESTER FOR MEASURING A PITCH STATIC ATTITUDE OF A HEAD STACK ASSEMBLY

BACKGROUND

A conventional disk drive includes a head stack assembly to read and write data to and from a magnetic rotating disk. Generally, the slider should be substantially level relative to the magnetic rotating disk. If a slider of the head stack assembly is tilted too much, the slider may not read and write data to and from the magnetic rotating disk correctly. Thus, prior to installation of the head stack assembly in the disk drive, the head stack assembly is tested or calibrated using a conventional tester to determine a pitch static attitude of the head stack assembly.

The conventional tester transmits and receives laser beams to determine the pitch static attitude of the head stack assembly. However, the head stack assembly often contains gaps, which may distort or cause errors during the determination of the pitch static attitude of the head stack assembly by the head stack assembly. Thus, the conventional tester may erroneously determine that the head stack assembly contains problems with its pitch static attitude resulting in unnecessary adjustments or replacement of the head stack assembly. In addition, the conventional tester may erroneously determine that the head stack assembly does not contain problems with its pitch static attitude resulting in future failures of the disk drive.

BRIEF DESCRIPTION OF THE DRAWINGS

The features and advantages of the present embodiments will become more apparent from the detailed description set forth below when taken in conjunction with the drawings, wherein.

DETAILED DESCRIPTION

Figure 1:
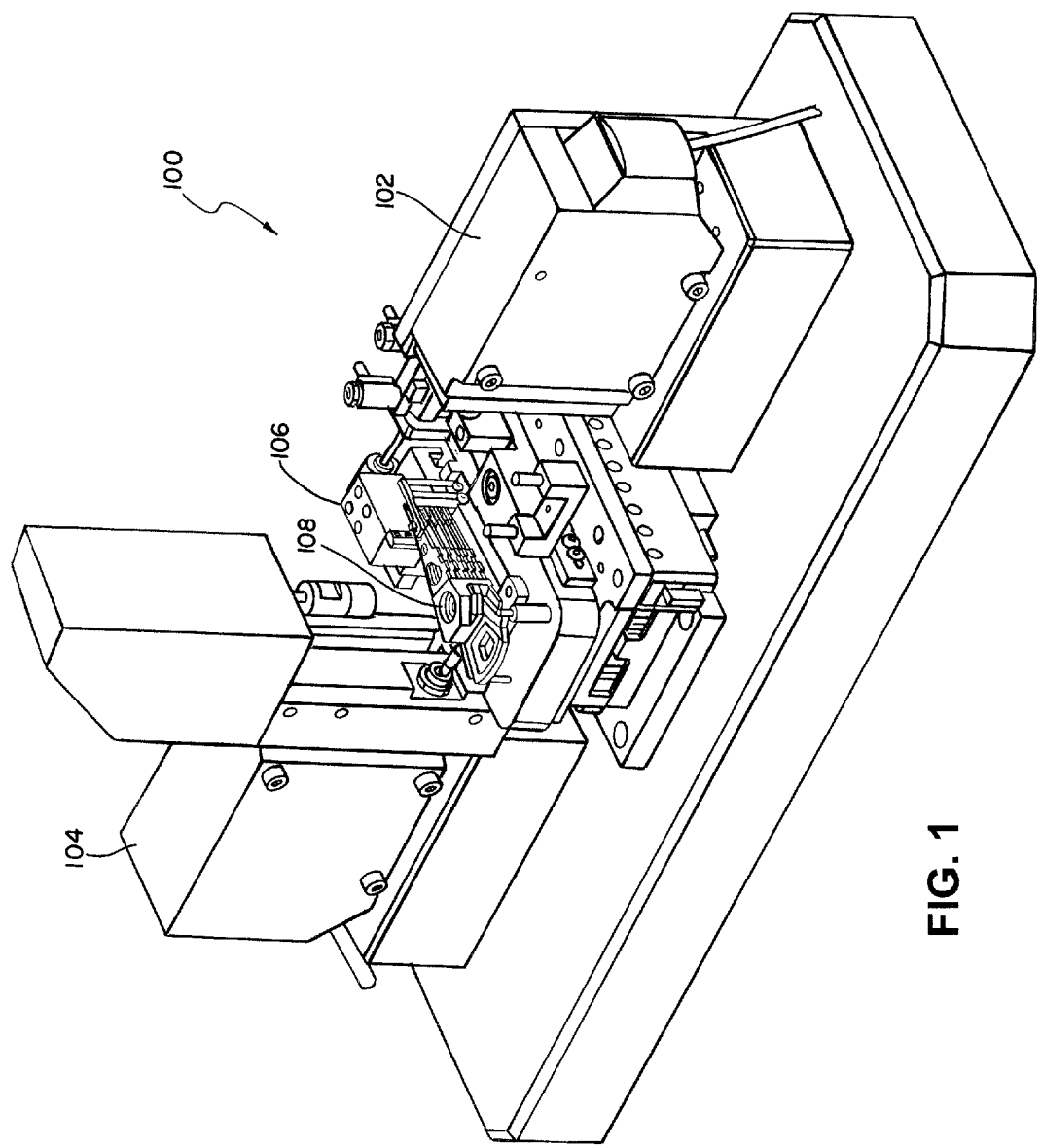
FIG. 1 depicts a tester for measuring a pitch static attitude of a head stack assembly according to an embodiment.

In an embodiment, as seen in FIG. 1, a tester 100 includes a laser transmitter 102, a laser receiver 104, and a laser guide 106. In an embodiment, the tester 100 is a pitch static attitude scanner machine configured to measure a pitch static attitude of a head stack assembly 108. In an embodiment, the laser transmitter 102 is a charge coupled device laser transmitter, and the laser receiver 104 is a charge coupled device laser receiver. In an embodiment the head stack assembly 108 is a head stack assembly for a disk drive. In an embodiment, the disk drive includes a magnetic rotating disk.

The head stack assembly 108 is placed between the laser transmitter 102 and the laser receiver 104, which can include one or more head stack assemblies. To determine the pitch static attitude of the of the head stack assembly 108, the laser transmitter 102 transmits laser beams to the laser receiver 104 with relevant portions of the head stack assembly 108 blocking some of the laser beams 128.

In an embodiment, the pitch static attitude of the head stack assembly 108 can be determined based on a location and amount of the laser beams that are received by the laser receiver 104. For example, each of the laser beams transmitted by the laser transmitter 102 can be considered a laser pixel, and the location and number of laser pixels received by the laser receiver 104 can provide an indication of the pitch static attitude of the head stack assembly 108.

Furthermore, in an embodiment, the head stack assembly 108 can include one or more gaps, which will be described in more detail later. Laser beams which enter the gap in the head stack assembly 108 and reach the laser receiver 104 may be considered noise because the determination of the pitch static attitude for the head stack assembly 108 may be based on the laser beams which are received by the laser receiver 104 around relevant portions of the head stack assembly instead of around the gaps, which will be described in more detail below. By reducing the noise in the measurements, an accuracy of the pitch static attitude measurements may be increased. For example, the gage repeatability and reproducibility of the pitch static attitude data can be improved.

In an embodiment, the laser guide 106 comprises a stainless steel material or a tungsten carbide material. In an embodiment, the laser guide 106 comprises alternative material that is sufficient to absorb or block laser beams from entering the gaps in the head stack assembly 108 and reaching the laser receiver 104.

Figure 2:
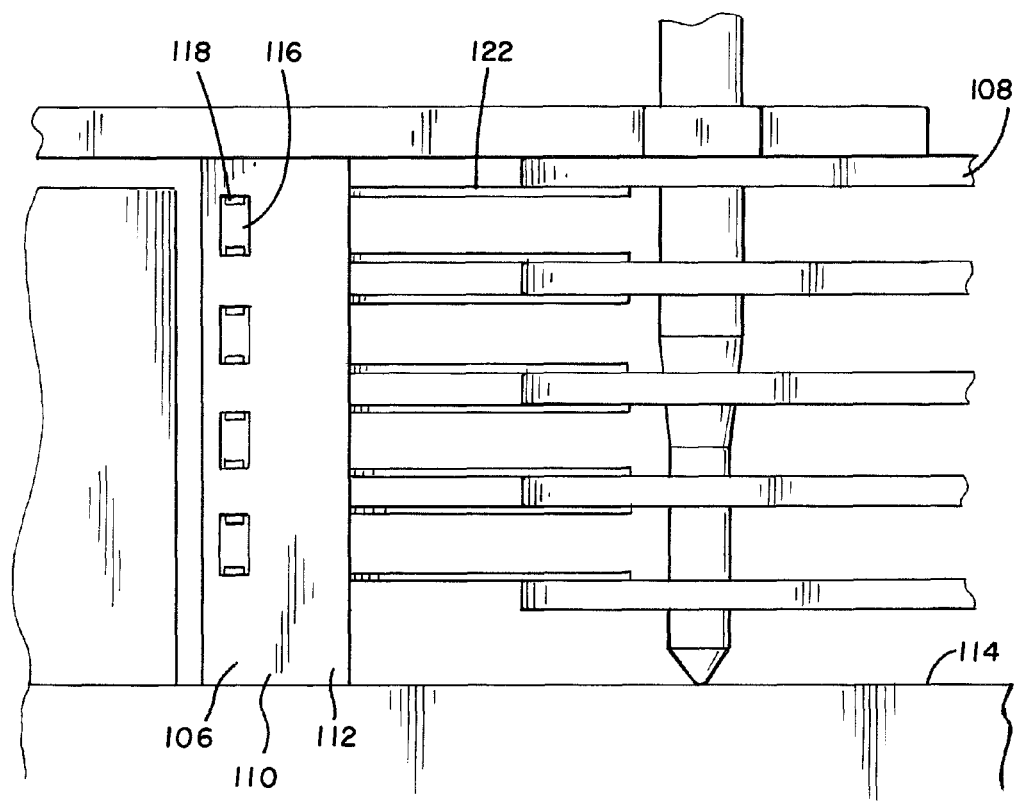
FIG. 2 depicts a first side view of a laser guide and a head stack assembly according to an embodiment.

FIG. 2 depicts the laser guide 106 and the head stack assembly 108 from a first side according to an embodiment. As can be seen in FIG. 2, the head stack assembly 108 includes a beam 122 and a slider 118. The head stack assembly 108 also includes a flexure 120, which is obstructed by the laser guide 106 in FIG. 2, but which will be shown in more detail later. The laser guide 106 further defines an opening 116. The opening 116 can be, for example, a rectangular shaped opening. In an embodiment, the opening 116 is sized and shaped relative to the head stack assembly 108 to allow the laser beams from the laser transmitter 102 to measure the pitch static attitude of the slider 118. In an embodiment, the opening 116 is sized and shaped relative to the head stack assembly 108 to block laser beams from the laser transmitter 102 from entering a gap in the head stack assembly 108 and reaching the laser receiver 104.

Furthermore, in an embodiment, as seen in FIG. 2, the laser guide 106 comprises a tower reference plane 112. The tower reference plane 112 can be used, for example, to ensure that that the head stack assembly 108 is placed in the correct position relative to the laser beams. In an embodiment, the tester 100 also includes a zero reference plane 114. The zero reference plane 114 can be used, for example, for calibration of the laser beams.

Figure 3:
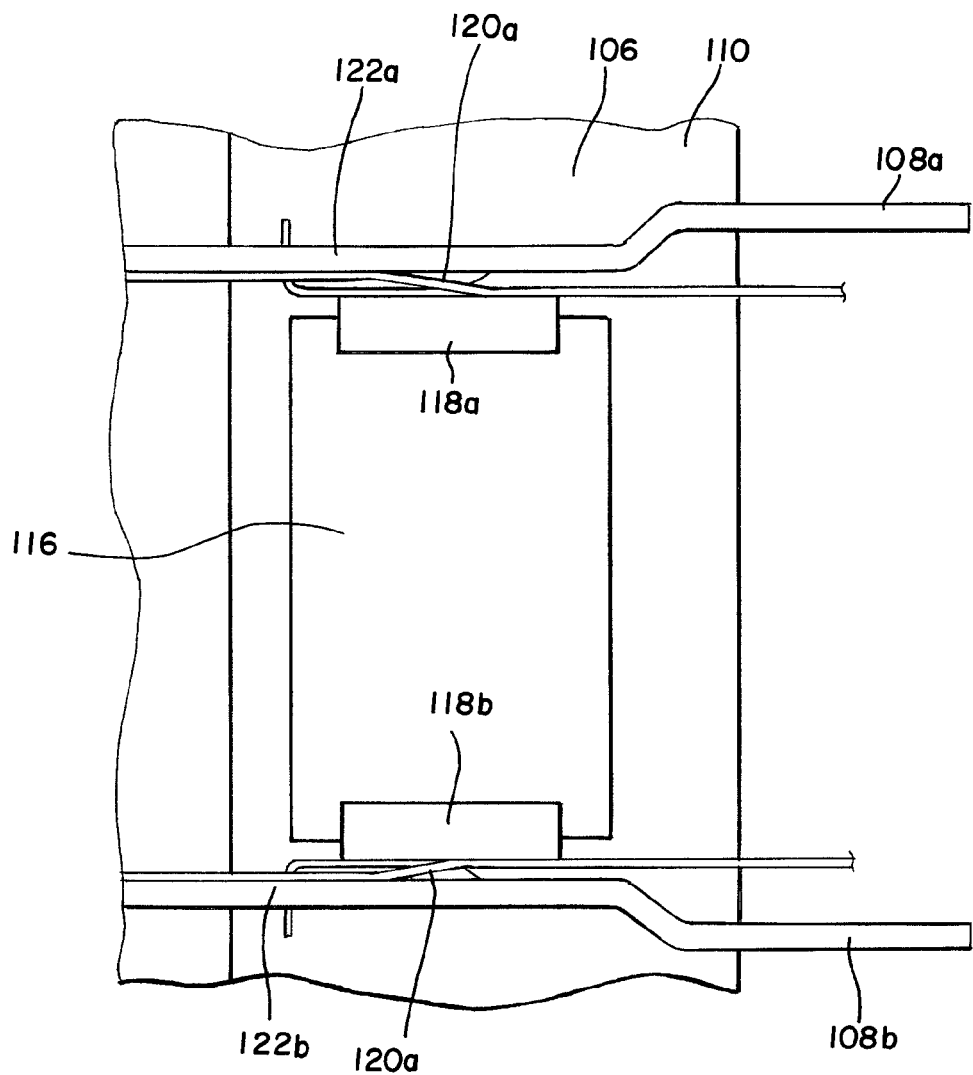
FIG. 3 depicts a second side view of a laser guide and a head stack assembly according to an embodiment.

FIG. 3 depicts a close-up of the laser guide 106 and the head stack assembly 108 from a second side according to an embodiment. In FIG. 3, the head stack assembly 108 comprises a head stack assembly 108a, and a head stack assembly 108b. The head stack assembly 108a includes a slider 118a, a flexure 120a, and a beam 122a, while the head stack assembly 108b includes a slider 118b, a flexure 120b, and a beam 122b. As seen in FIG. 3, the laser guide 106 can be utilized to block laser beams from entering the gaps of head stack assemblies 108a and 108b, and reaching the laser receiver 104.

Figure 4:
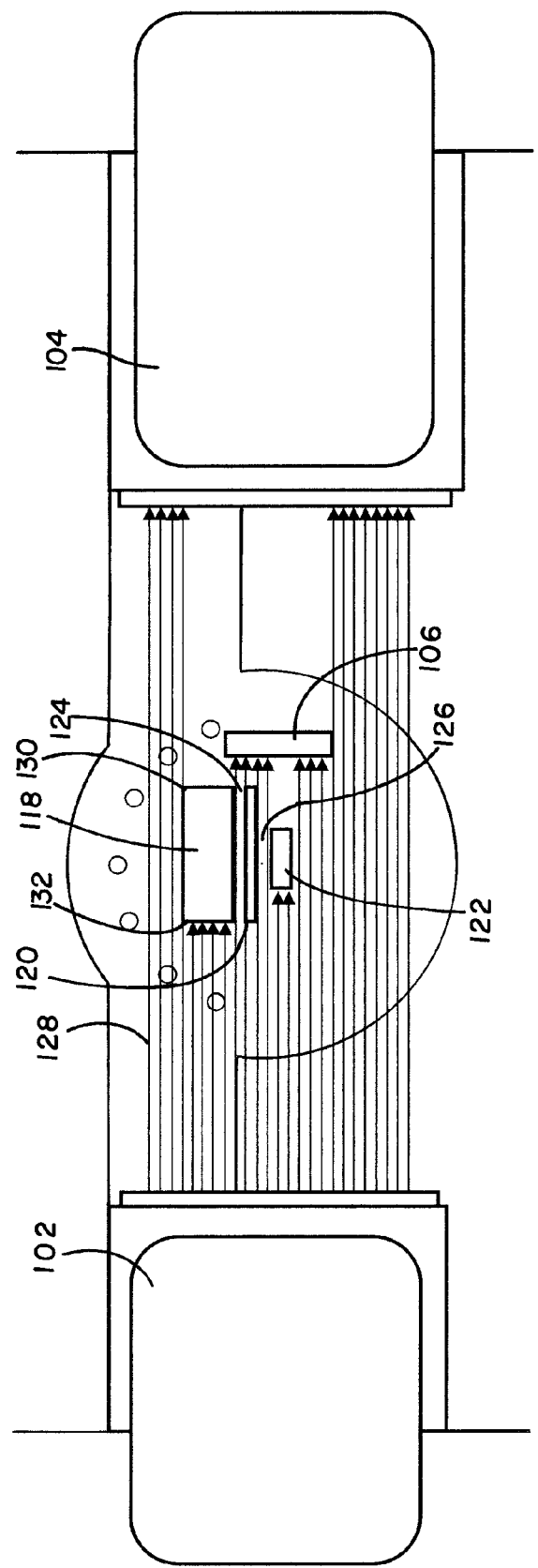
FIG. 4 depicts a front view of a laser transmitter, a laser receiver, a head stack assembly, and a laser guide according to an embodiment.

FIG. 4 depicts a schematic front view of the tester 100 and the head stack assembly 108 according to an embodiment. As can be seen in FIG. 4, the head stack assembly 108 includes a gap 124 between a slider 118 and a flexure 120, and a gap 126 between a flexure 120 and a beam 122. Furthermore, the slider 118 includes a first edge 130 and a second edge 132.

The laser transmitter 102 transmits laser beams 128 to the laser receiver 104 to determine the pitch static attitude of the slider 118 of the head stack assembly 108. In an embodiment, the tester 100 determines the pitch static attitude through the laser beams 128 that are received by the laser receiver 104 and which correspond to the first edge 130 or the second edge 132. The laser guide 106 blocks the laser beams 128 from entering the gaps 124 and 126 and reaching the laser receiver 104.

In an embodiment, the laser beams 128 which enter the gaps 124 and 126 and which reach the laser receiver 104 would be considered noise because they may interfere with the analysis of the laser beams 128 received by the laser receiver 104 that correspond to the first edge 130 or the second edge 132. Thus, by preventing the laser beams 128 from entering the gaps 124 and 126 and reaching the laser receiver 104, a more accurate pitch static attitude of the head stack assembly 108 can be determined.

In FIG. 4, the laser guide 106 is depicted as having a rectangular block cross-section. However, as previously noted, the laser guide 106 can be appropriately dimensioned to block the laser beams 128 from entering the gaps 124 and 126 and reaching the laser receiver 104.

Figure 5:
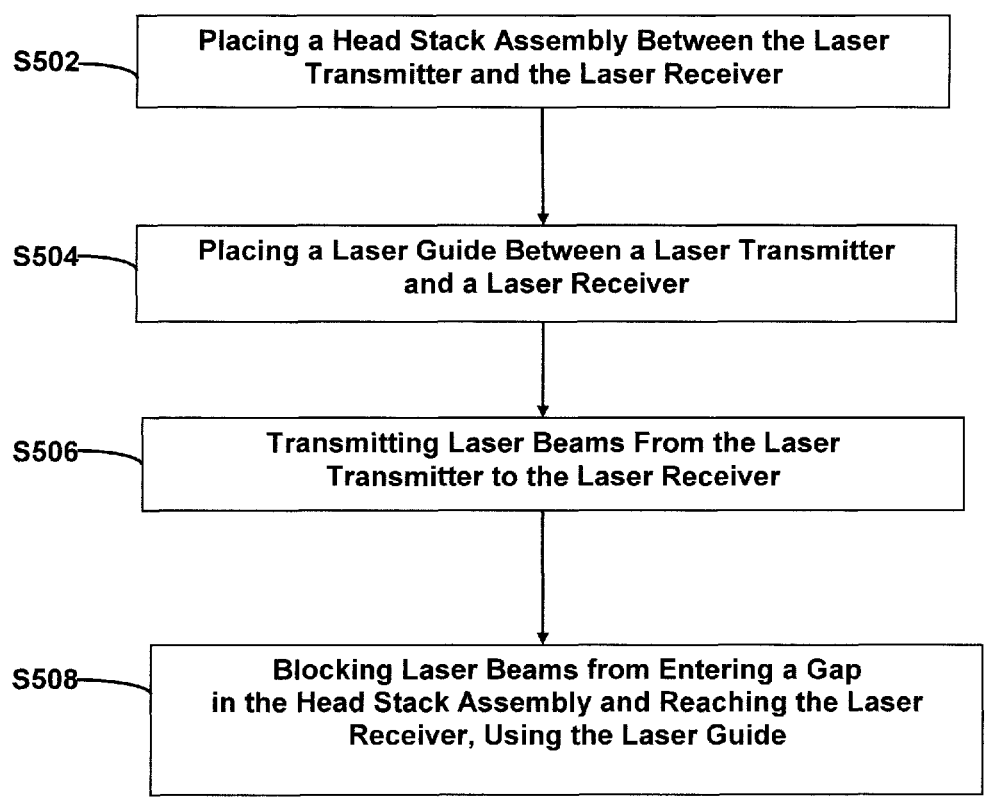
FIG. 5 depicts a process for measuring a pitch static attitude of a head stack assembly according to an embodiment.

In operation, the head stack assembly 108 is placed between the laser transmitter 102 and the laser receiver 104 in Block S502 as shown in an embodiment in FIG. 5. For example, the head stack assembly 108 including the slider 118, the flexure 120, and the beam 122 are placed between the laser transmitter 102 and the laser receiver 104 as shown in FIGS. 1 and 4.

Figure 6:
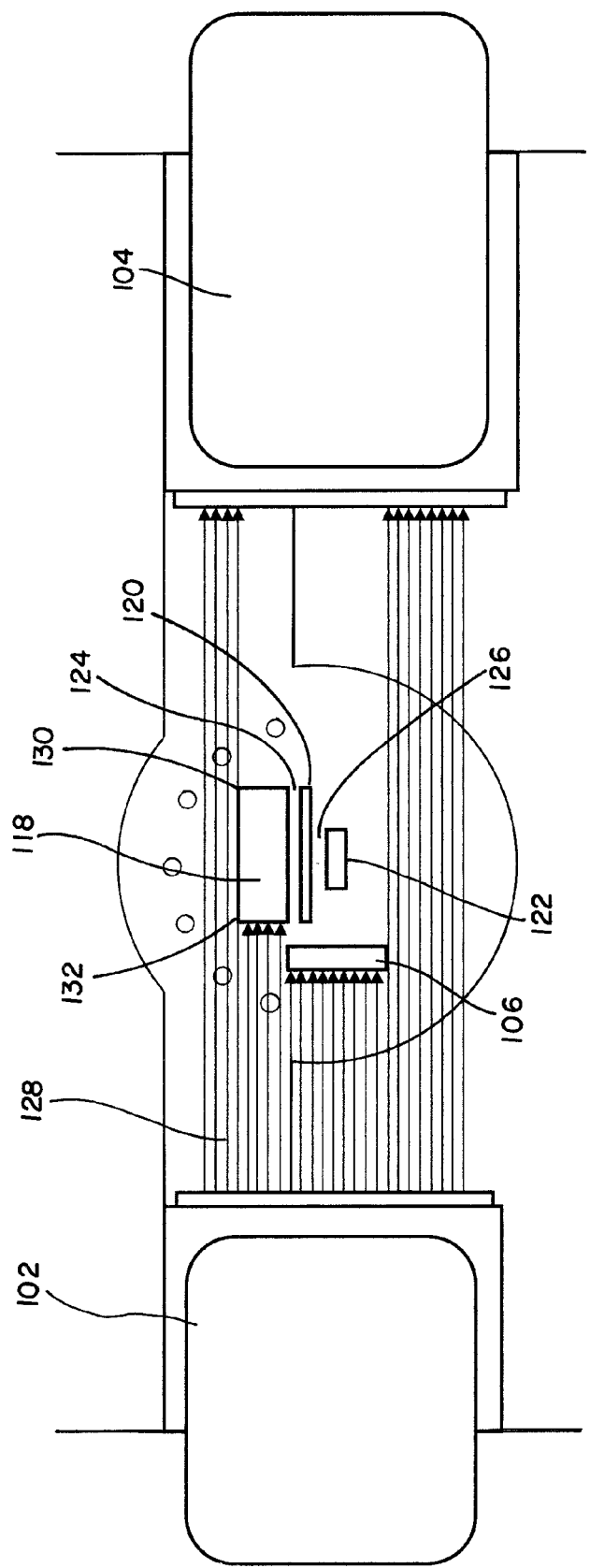
FIG. 6 depicts a front view of a laser transmitter, a laser receiver, a head stack assembly, and a laser guide according to an embodiment.

In an embodiment, a process for measuring a pitch static attitude of a head stack assembly using a tester is shown in FIG. 5. In Block S504, the laser guide 106 is placed between the laser transmitter 102 and the laser receiver 104 as shown in an embodiment in FIG. 4. In FIG. 4, the laser guide 106 is placed between the head stack assembly 108 and the laser receiver 104. However, in an embodiment, as shown in FIG. 6, the laser guide 106 is placed between the laser transmitter 102 and the head stack assembly 108. In an embodiment, the laser guide 106 can be placed closer or further away from the laser transmitter 102 and/or laser receiver 104 provided that the laser guide 106 blocks the laser beams 128 from entering the gaps 124 and 126 and being received by the laser receiver 104. In an embodiment, the laser transmitter 102 and the laser receiver 104 are depicted in a home position. The home position can be used to calibrate or receive base data for the tester 100.

Figure 7:
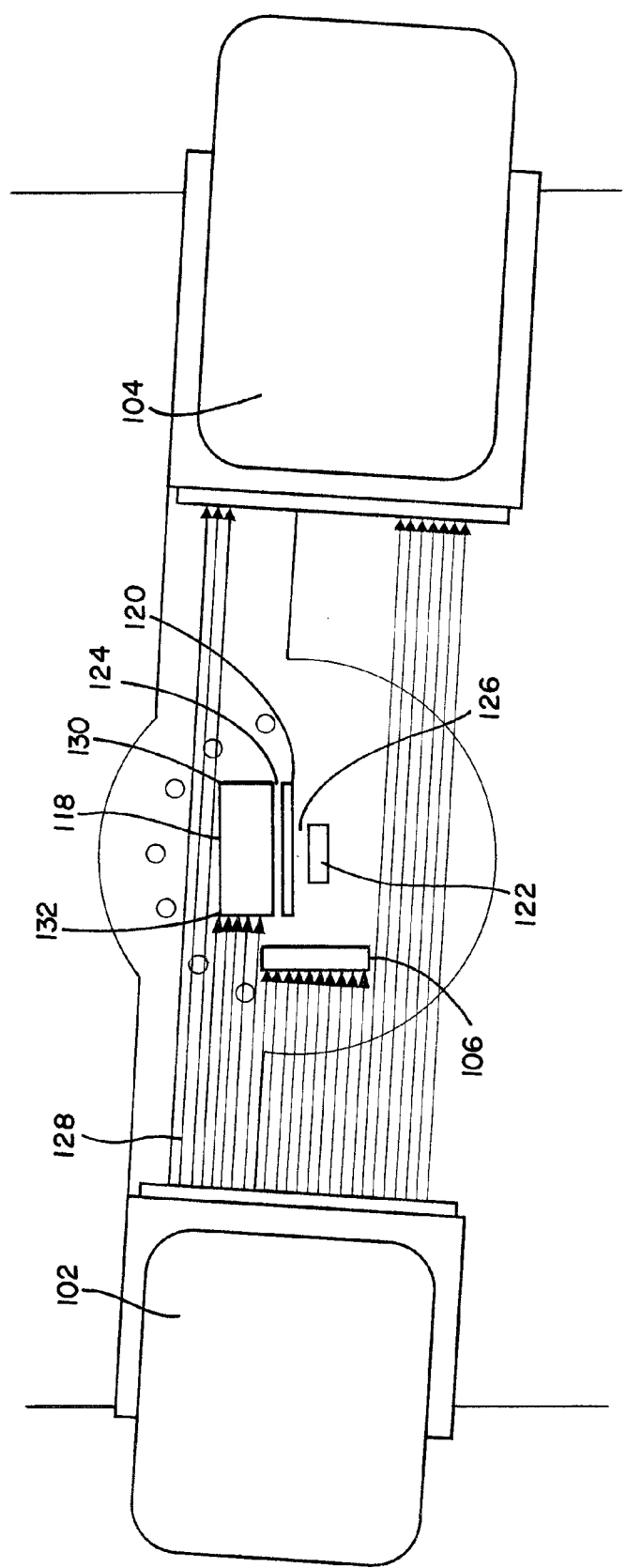
FIG. 7 depicts a front view of a laser transmitter, a laser receiver, a head stack assembly, and a laser guide wherein the laser transmitter and the laser receiver are rotated according to an embodiment.
Figure 8:
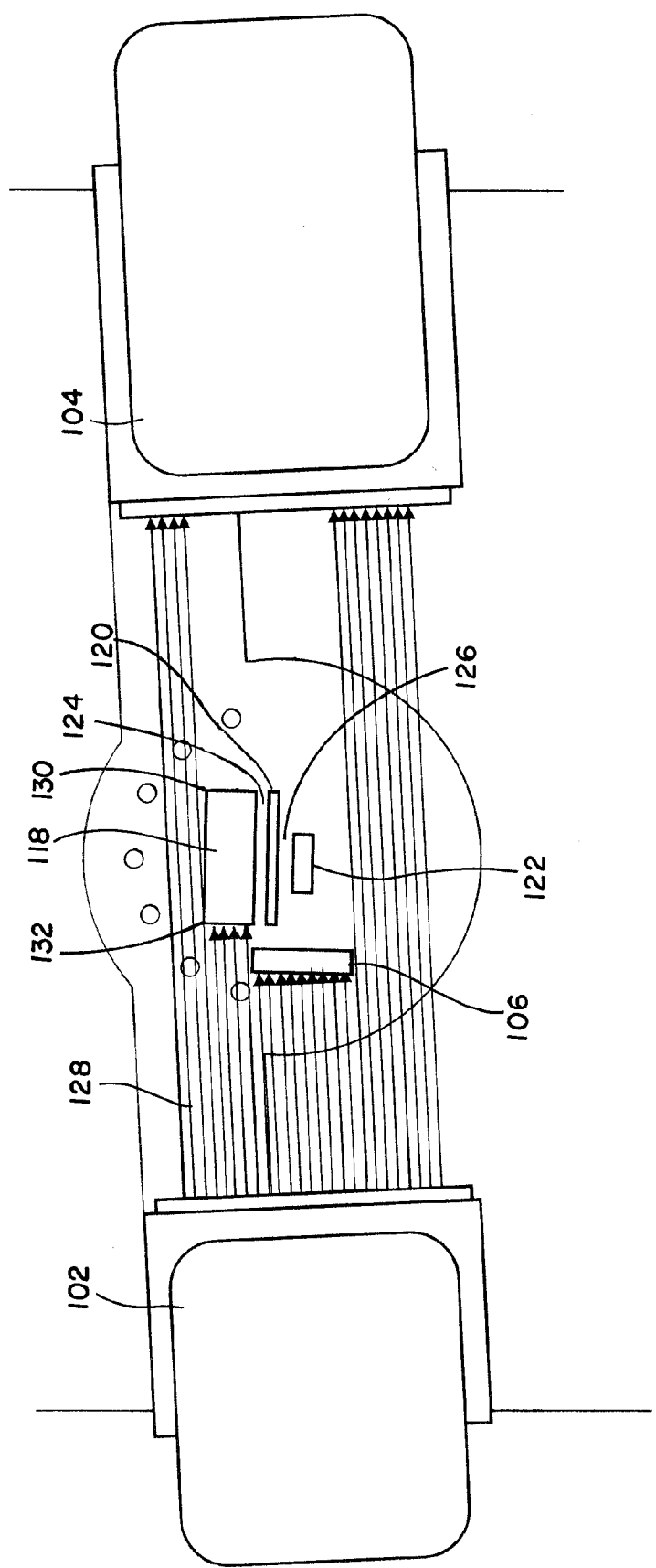
FIG. 8 depicts a front view of a laser transmitter, a laser receiver, a head stack assembly, and a laser guide wherein the laser transmitter and the laser receiver are rotated according to an embodiment.

In Block S506, laser beams 128 are transmitted from the laser transmitter 102 to the laser receiver 104 as shown in FIGS. 4 and 6. In an embodiment, as seen in FIGS. 7 and 8, the laser transmitter 102 and the laser receiver 104 are rotated counter-clockwise, or clockwise to measure the first edge 130 or the second edge 132 of the slider 118 of the head stack assembly 108 to determine the pitch static attitude of the slider 118. The laser transmitter 102 and/or the laser receiver 104 can be rotated, for example, by an actuator. In an embodiment, the first edge 130 of the slider 118 refers to an upper right edge of the slider 118, while the second edge 132 refers to an upper left edge of the slider 118.

In an embodiment as shown in FIGS. 7 and 8, the slider 118 is not tilted. However, in an embodiment shown in FIG. 9, the slider 118 is tilted towards the laser receiver 104, and in an embodiment shown in FIG. 10, the slider 118 is tilted towards the laser transmitter 102. Thus, the slider 118 in FIGS. 9 and 10 has a pitch static attitude that will need to be adjusted to ensure that the slider 118 is substantially level. For example, the slider 118 in FIG. 9 should be rotated counter clockwise, while the slider 118 should be rotated clockwise.

In Block S508 the laser guide 106 blocks the laser beams 128 from entering a gap in the head stack assembly 108 and reaching the laser receiver 104, as seen in embodiments disclosed in FIGS. 4 and 6. For example, in FIG. 4, the laser guide 106 blocks the laser beams 128 after the laser beams 128 enter the gaps 124 and 126, but before they reach the laser receiver 104. In FIG. 6, the laser guide 106 blocks the laser beams 128 before the laser beams 128 enter the gaps 124 and 126, and before they reach the laser receiver 104.

Figure 9:
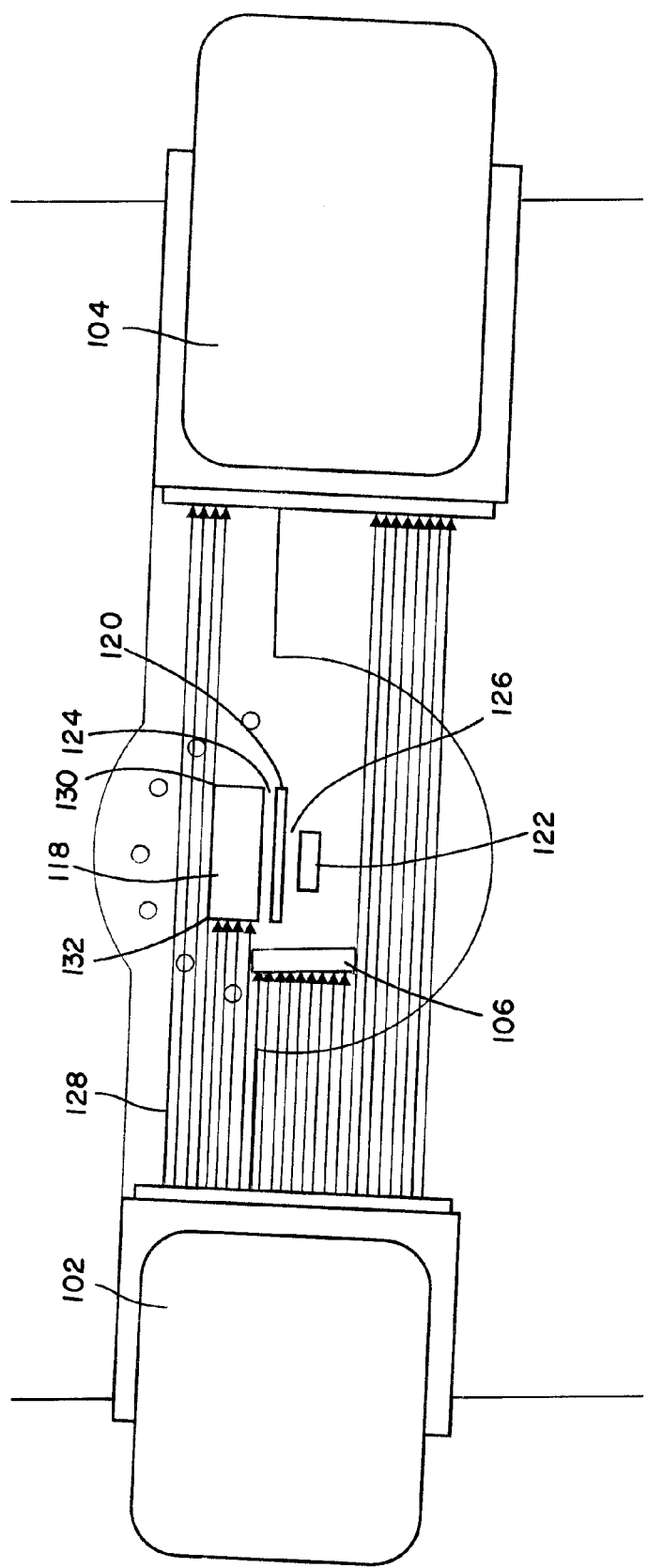
FIG. 9 depicts a front view of a laser transmitter, a laser receiver, a head stack assembly, and a laser guide wherein the laser transmitter and the laser receiver are rotated, and the head stack assembly is tilted according to an embodiment.
Figure 10:
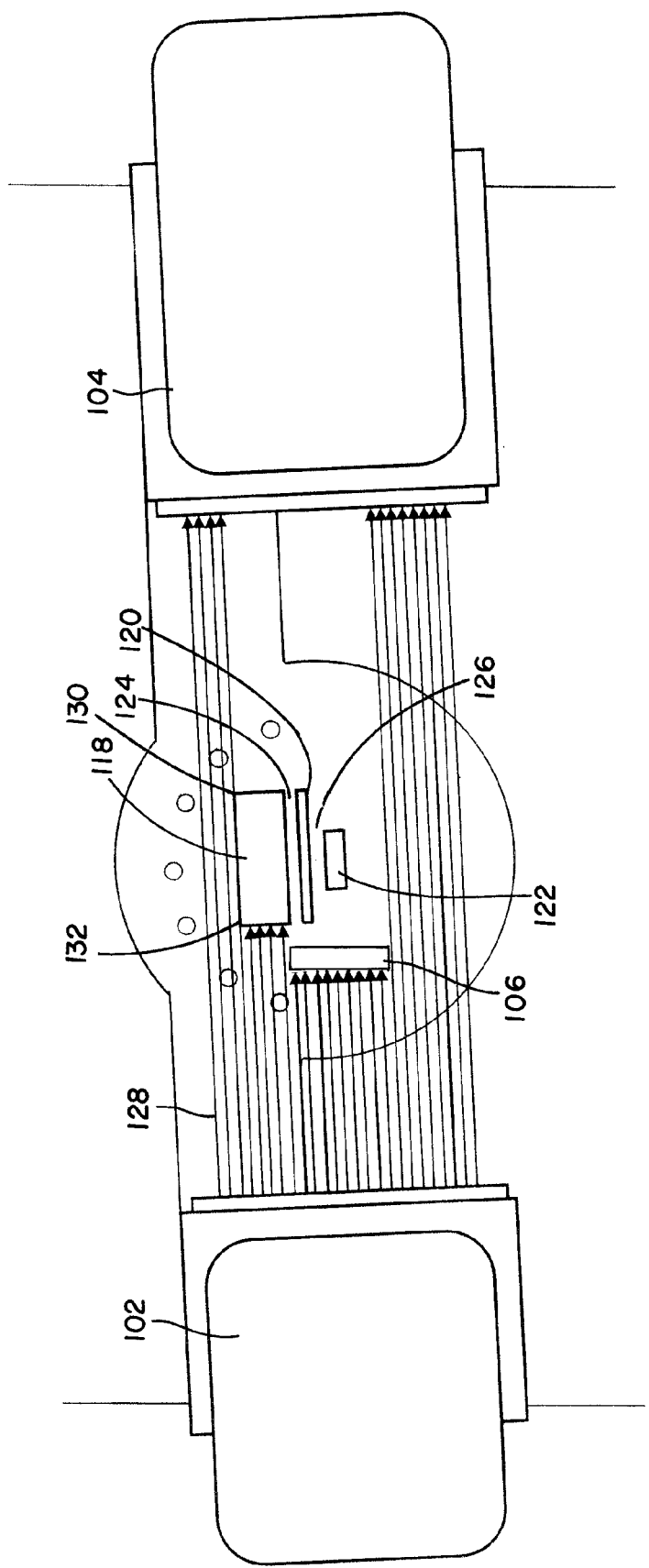
FIG. 10 depicts a front view of a laser transmitter, a laser receiver, a head stack assembly, and a laser guide wherein the laser transmitter and the laser receiver are rotated, and the head stack assembly is tilted according to an embodiment.

In FIGS. 7 and 8, the laser guide 106 blocks the laser beams 128 from entering the gaps 124 and 126 even when the laser transmitter 102 and the laser receiver 104 are rotated counter-clockwise, or clockwise to measure the pitch static attitude of the first edge 130 or the second edge 132 of the slider 118. In FIGS. 9 and 10, the laser guide 106 blocks the laser beams 128 from entering the gaps 124 and 126 even when the slider 118 of the head stack assembly 108 is tilted towards the laser transmitter 102 or the laser receiver 104.

In an embodiment, although the laser guide 106 is depicted as preventing the laser beams 128 from entering the gaps 124 and 126 and reaching the laser receiver 104, the laser guide 106 can also prevent the laser beams 128 from entering additional or different gaps in the head stack assembly 108 and reaching the laser receiver 104. Furthermore, in an embodiment, the laser transmitter 102 and the laser receiver 104 can return to the home position (FIGS. 4 and 6) between measurements of the first edge 130 (FIGS. 7 and 9) and/or the second edge 132 (FIGS. 8 and 10) of the slider 118.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A tester for measuring a pitch static attitude of a head stack assembly comprising:
    a laser transmitter configured to transmit laser beams;
    a laser receiver configured to receive the laser beams from the laser transmitter, wherein the laser transmitter and the laser receiver are configured to receive a head stack assembly between the laser transmitter and the laser receiver; and
    a laser guide located between the laser transmitter and the laser receiver, and configured to:
        block some of the laser beams from entering at least one of: (1) a gap between a slider of the head stack assembly and a flexure of the head stack assembly and (2) a gap between a beam of the head stack assembly and a flexure of the head stack assembly and reaching the laser receiver;
        allow other of the laser beams not blocked by the laser guide to reach the laser receiver.

2. The tester of claim 1 wherein the laser transmitter and the laser receiver are configured to receive a first head stack assembly, and a second head stack assembly, and the laser guide is configured to block the laser beams from entering a gap in the first head stack assembly and reaching the laser receiver, and to block the laser beams from entering a gap in the second head stack assembly and reaching the laser receiver.

3. The tester of claim 2 wherein the laser guide defines a rectangular shaped opening.

4. The tester of claim 1 wherein the laser guide is configured to be located between the laser transmitter and the head stack assembly.

5. The tester of claim 1 wherein the laser guide is configured to be located between the head stack assembly and the laser receiver.

6. The tester of claim 1 wherein the laser guide comprises a stainless steel material.

7. The tester of claim 1 wherein the laser guide comprises a tungsten carbide material.

8. The tester of claim 1 wherein the laser guide further comprises a tower reference plane.

9. A method for measuring a pitch static attitude of a head stack assembly using a tester comprising a laser transmitter, a laser receiver, and a laser guide, the method comprising:
    placing a head stack assembly between the laser transmitter and the laser receiver;
    placing a laser guide between a laser transmitter and a laser receiver;
    transmitting laser beams from the laser transmitter to the laser receiver;
    blocking, using the laser guide, some of the laser beams from entering at least one of: (1) a gap between a slider of the head stack assembly and a flexure of the head stack assembly and (2) a gap between a beam of the head stack assembly and a flexure of the head stack assembly and reaching the laser receiver; and
    allowing other of the laser beams not blocked by the laser guide to reach the laser receiver.

10. The method of claim 9 further comprising:
    placing a first head stack assembly, and a second head stack assembly, between the laser transmitter and the laser receiver;
    blocking laser beams from entering a gap in the first head stack assembly and reaching the laser receiver, using the laser guide; and
    blocking laser beams from entering a gap in the second head stack assembly and reaching the laser receiver, using the laser guide.

11. The method of claim 9 further comprising placing the laser guide between the laser transmitter and the head stack assembly.

12. The method of claim 9 further comprising placing the laser guide between the head stack assembly and the laser receiver.

13. The method of claim 9 wherein the laser guide defines a rectangular shaped opening.

14. The method of claim 9 wherein the laser guide comprises a stainless steel material or a tungsten carbide material.

15. The method of claim 9 wherein the laser guide further comprises a tower reference plane.

* * * * *